US008660870B2

(12) United States Patent  
Giancola et al.

(10) Patent No.: US 8,660,870 B2  
(45) Date of Patent: Feb. 25, 2014

(54) METHOD AND SYSTEM FOR MODELING A CALL CENTER TRANSFORMATION PROCESS

(75) Inventors: Augusto Rafael Giancola, South Pasadena, CA (US); Patrick Howard, Katonah, NY (US); Neal Chamberlin Nolan, Austin, TX (US); Robert Douglas Van Wingerden, Suwanee, GA (US)

(73) Assignee: International Business Machines Corporation, Armonk, NY (US)

( * ) Notice: Subject to any disclaimer, the term of this patent is extended or adjusted under 35 U.S.C. 154(b) by 2023 days.

(21) Appl. No.: 11/058,387

(22) Filed: Feb. 15, 2005

(65) Prior Publication Data

US 2006/0184408 A1 Aug. 17, 2006

(51) Int. Cl.
*G06Q 10/00* (2012.01)

(52) U.S. Cl.
USPC ........................................ 705/7.11; 705/7.38

(58) Field of Classification Search
USPC .............................................. 705/7.11, 7.38
See application file for complete search history.

(56) References Cited

U.S. PATENT DOCUMENTS

| | | | |
|---|---|---|---|
| 5,229,948 A | 7/1993 | Wei et al. | |
| 5,734,837 A | 3/1998 | Flores et al. | |
| 5,765,137 A | 6/1998 | Lee | |
| 5,799,286 A | 8/1998 | Morgan et al. | |
| 5,999,724 A | 12/1999 | Iwasa et al. | |
| 6,038,540 A | 3/2000 | Krist et al. | |
| 6,216,108 B1 | 4/2001 | LeVander | |
| 6,219,654 B1 | 4/2001 | Ruffin | |
| 6,260,020 B1 | 7/2001 | Ruffin et al. | |
| 6,684,192 B2 | 1/2004 | Honarvar et al. | |
| 7,003,079 B1* | 2/2006 | McCarthy et al. | 379/32.01 |
| 7,020,621 B1* | 3/2006 | Feria et al. | 705/7.29 |
| 7,039,166 B1* | 5/2006 | Peterson et al. | 379/88.18 |
| 7,106,850 B2* | 9/2006 | Campbell et al. | 379/265.09 |
| 7,428,303 B2* | 9/2008 | Campbell et al. | 379/265.09 |
| 2002/0169842 A1 | 11/2002 | Christensen et al. | |
| 2003/0120539 A1* | 6/2003 | Kourim et al. | 705/11 |
| 2005/0065837 A1* | 3/2005 | Kosiba et al. | 705/9 |
| 2006/0217989 A1* | 9/2006 | Smith et al. | 705/1 |

FOREIGN PATENT DOCUMENTS

| | | |
|---|---|---|
| JP | 2000-003389 A | 1/2000 |
| JP | 2000-011039 A | 1/2000 |
| JP | 2000-322252 A | 11/2000 |
| JP | 2001-067407 A | 3/2001 |

(Continued)

OTHER PUBLICATIONS

Blackwood et al., Call Center Process, IBM Corporation Dossier, 7 pages.

(Continued)

*Primary Examiner* — Mark A Fleischer
(74) *Attorney, Agent, or Firm* — Yudell Isidore Ng Russell PLLC (57) ABSTRACT

A computer-implemented method, system and program product for modeling a business transformation process. In accordance with one embodiment, a transformation modeling tool receives as input multiple operational resource values associated with a specified transformation process. The operational resource values include at least one value expressed as a labor resource metric and at least one value expressed as a technology resource metric. The modeling tool comparatively processes the operational resource values with respect to one or more target operational resource values. Responsive to the comparative processing step, a cost value associated with the specified transformation process is generated.

6 Claims, 5 Drawing Sheets

(56) References Cited

FOREIGN PATENT DOCUMENTS

| | | |
|---|---|---|
| JP | 92001338120 A | 12/2001 |
| JP | 92002024520 A | 1/2002 |
| JP | 2002-279147 A | 9/2002 |
| JP | 2003-085342 A | 3/2003 |
| JP | 2003-223551 A | 8/2003 |
| JP | 2003-308421 A | 10/2003 |
| JP | 2004-127265 A | 4/2004 |
| JP | 2004-185442 A | 7/2004 |

OTHER PUBLICATIONS

Information Materials for IDS for END920040091JP1, dated Jan. 19, 2012.

Information Materials for IDS form END920040091JP1 dated Mar. 10, 2011.

Information Materials for IDS form END920040091JP1 dated Aug. 15, 2011.

* cited by examiner

METHOD AND SYSTEM FOR MODELING A CALL CENTER TRANSFORMATION PROCESS

BACKGROUND OF THE INVENTION

1. Technical Field

The present invention generally relates to business solutions management and in particular to systems and methods supporting business transformation techniques and planning. More particularly, the present invention relates to a system and method for modeling business transformation initiatives including estimating comprehensive and diagnostic performance metrics relating to call center functions.

2. Description of the Related Art

Advances in communications and data processing systems have facilitated the rise of Business Process Outsourcing (BPO) as a vital resource in improving overall business operating efficiency. Under BPO, an outsourcer entity is contracted to perform one or more sub-processes of a client entity's overall business operation. Such outsourced processes are often non-core, logistical or support processes such as human resources, accounting and reporting, etc., in which the efficiency of specialization can be most greatly leveraged.

Business Transformation Outsourcing (BTO) is a type of BPO. Unlike BPO wherein the outsourced process(es) typically undergoes little if any change in regard to fundamental operating metrics and procedures, BTO is directed to selecting and implementing one or more initiatives that define the manner and/or means by which a desired outsourced process will be changed over a period of time. Such transformation initiates are undertaken for a variety of reasons including addressing changing marketplace conditions, conforming to outsourcer resources and conventions, etc. Information technology (IT) plays an increasingly significant role in effectuating such transformation initiatives, particularly in web-based business applications such as on-demand customer service processes.

Call centers are an increasingly important feature of most large business enterprises and includes process, organizational, and technological aspects, making transformation of call center operations particularly complex. Call centers generally comprise the process and associated technology utilized by a business entity to interact with its customers. Call centers (sometimes alternatively referred to as contact centers) generally comprise resources and processes by which customers interact with the company through human agents and/or automated means to communicate or otherwise transact business with the company.

Call center transformation plans, whether implemented via BTO or as part of an in-house program, are often complex, requiring a considerable initial investment in terms of time, resources, and hard costs. It can therefore be appreciated that a need exists for a system and method that address problems related to the complexity inherent in call center transformation programs. The present invention addresses such a need and other needs unresolved by the prior art.

SUMMARY OF THE INVENTION

A computer-implemented method, system and program product for modeling a business transformation process are disclosed herein. In accordance with one embodiment, a transformation modeling tool receives as input multiple operational resource values associated with a specified transformation process. The operational resource values include at least one value expressed as a labor resource metric and at least one value expressed as a technology resource metric. The modeling tool comparatively processes the operational resource values with respect to one or more target operational resource values. Responsive to the comparative processing step, a cost value associated with the specified transformation process is generated.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention is generally directed to a method, system and computer program product that facilitate the planning and management phases of business transformation processes. More specifically, the present invention is directed to a tool and method for predictively determining adjustments in operational metrics and associated cost drivers to achieve optimum call center process and cost efficiency. In one embodiment, the invention comprises a top-down modeling tool that comparatively processes operational metric input characterizing a transformation project with respect to industry-specific performance benchmark data to estimate aggregate operating costs for the project. In an alternate embodiment, a bottom-up modeling tool is utilized to model a call center transformation project. The bottom-up modeling tool processes a combination of input operational metrics, including ratio-based metric relationship data to generate point-in-time and aggregate performance results for individual operational metrics. As explained in further detail with reference to the figures, the present invention may be practiced as a call center transformation management method and/or a data processing system adapted to implement the same to achieve the foregoing objectives.

The modeling tool of the present invention supports call center transformation steps including: consultation and plan selection, process analysis, and implementation. The planning and selection process is particularly complex, often requiring the planner to undertake a number of inter-dependent initiatives for achieving a level of operational efficiency and cost savings sufficient to justify the transformation plan.

In both the initial selection and subsequent revision of call center transformation options, it is very useful to provide computer-aided modeling tools for determining the aggregate impact of a proposed transformation solution/revision. In a BTO context, for example, the outsourcer must determine the impact of various initiatives in order to pre-screen and identify which initiatives to be provided for client consideration in the course of a sales engagement or during the life of the outsourced call center transformation/operation contract.

The invention addresses the complexity of call center transformation, facilitating efficient determination of the overall operational and financial impact of a proposed solution, and comparatively evaluating multiple solutions to identify those with the highest potential improvements. With reference now to the figures, wherein like reference numerals refer to like and corresponding parts throughout, and in particular with reference to FIG. 1, there is depicted a data processing system adapted for implementing the present invention. For discussion purposes, the data processing system is described as a personal computer, such as a desktop or portable computer. However, as used herein, the terms "data processing system," "computer," and the like, are intended to mean essentially any type of computing device or machine that is capable of running a software product.

While the invention will be described in the general context of an application program that runs on an operating system in conjunction with a personal computer, those skilled in the art will recognize that the invention may also be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including multiprocessor systems, microprocessor-based or programmable consumer electronics, minicomputers, mainframe computers, and the like.

Figure 1:
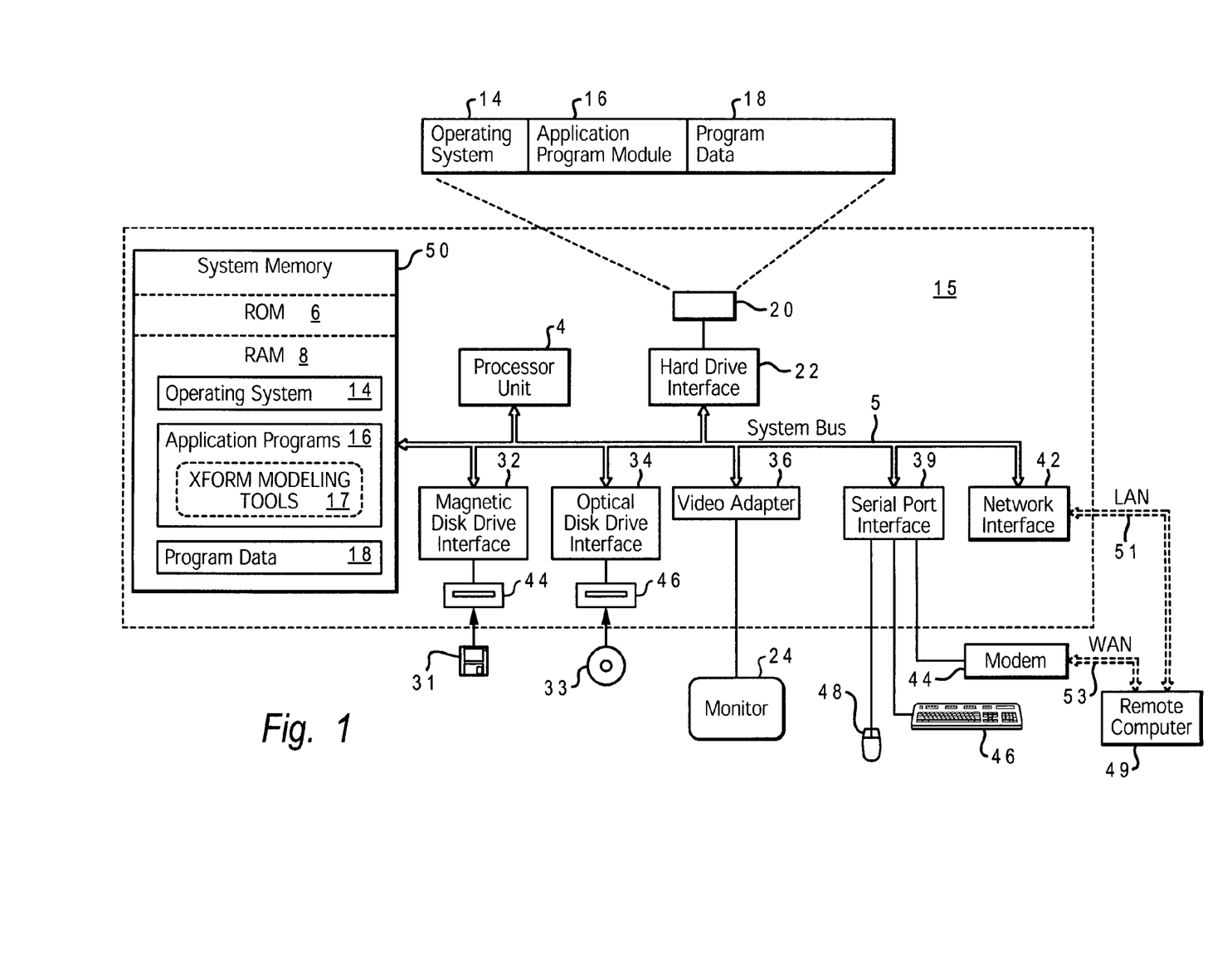
FIG. 1 depicts a data processing system adapted for implementing call center transformation modeling in accordance with the present invention.

The exemplary data processing system illustrated in FIG. 1 generally comprises a personal computer 15, having a processing unit 4, a system memory 50, and a system bus 5 that couples system memory 50 to processing unit 4. The system memory 50 includes read only memory (ROM) 6 and random access memory (RAM) 8. Personal computer 15 further includes a hard disk drive 20, a magnetic disk drive 44, e.g., to read from or write to a removable disk 31, and an optical disk drive 46, e.g., for reading a CD-ROM disk 33 or to read from or write to other optical media. Hard disk drive 20, magnetic disk drive 44, and optical disk drive 46 are connected to system bus 5 by a hard disk drive interface 22, a magnetic disk drive interface 32, and an optical drive interface 34, respectively. The drives and their associated computer-readable media provide non-volatile storage for personal computer 15. Although the description of computer-readable media above refers to a hard disk, a removable magnetic disk, and a CD-ROM disk, it should be appreciated by those skilled in the art that other types of media which are readable by a computer, such as magnetic cassettes, flash memory cards, digital video disks, Bernoulli cartridges, and the like, may also be used in the exemplary computer operating environment.

A number of program modules may be stored in the drives and system memory 50, including an operating system 14, application program modules 16, such as Microsoft's OFFICE suite of program modules, and program data 18.

A user may enter commands and information into personal computer 15 through a keyboard 46 and pointing device, such as a mouse 48. These and other input devices are connected to processing unit 4 through a serial port interface 39 that is coupled to the system bus, but may be connected by other interfaces such as a universal serial bus. A monitor 24 or other type of display device is also connected to system bus 5 via an interface, such as a video adapter 36.

Personal computer 15 may operate in a networked environment using logical connections to one or more remote computers, such as a remote computer 49. The remote computer 49 may be a server, a router, a peer device or other common network node, and typically includes many or all of the elements described relative to personal computer 15. The logical network connections depicted in FIG. 1 include a local area network (LAN) 51 and a wide area network (WAN) 53.

When used in a LAN networking environment, personal computer 15 is connected to LAN 51 through a network interface 42. When used in a WAN networking environment, personal computer 15 typically includes a modem 44 or other means for establishing communications over WAN 53, such as the Internet. The modem 44, which may be internal or external, is connected to system bus 5 via serial port interface 39. In a networked environment, program modules depicted relative to personal computer 15, or portions thereof, may be stored in one or more remote (i.e., network distributed) memory storage devices. It will be appreciated that the network connections shown are exemplary and other means of establishing a communications link between the computers may be used.

In accordance with the depicted embodiment, application programs 16 further includes one or more transformation modeling tools 17 such as are described in further detail below. Transformation modeling tools 17 include program modules and instructions enabling a user to predictively model the performance of a transformation initiative and/or an underway transformation project either of which may be characterized, in part, as a set of operating and cost metrics.

The disclosed methods may be readily implemented in software using object or object-oriented software development environments that provide portable source code that can be used on a variety of computer or workstation hardware platforms. The combination of software or hardware utilized to implement the present invention is dependent on the speed and/or efficiency requirements of the system, the particular function, and the particular software or hardware systems or microprocessor or microcomputer systems being utilized. The computer controlled display systems and methods described above, however, can be readily implemented in hardware and/or software using any known or later-developed systems or structures, devices and/or software by those skilled in the applicable art without undue experimentation from the functional description provided herein together with a general knowledge of the computer arts.

Figure 2:
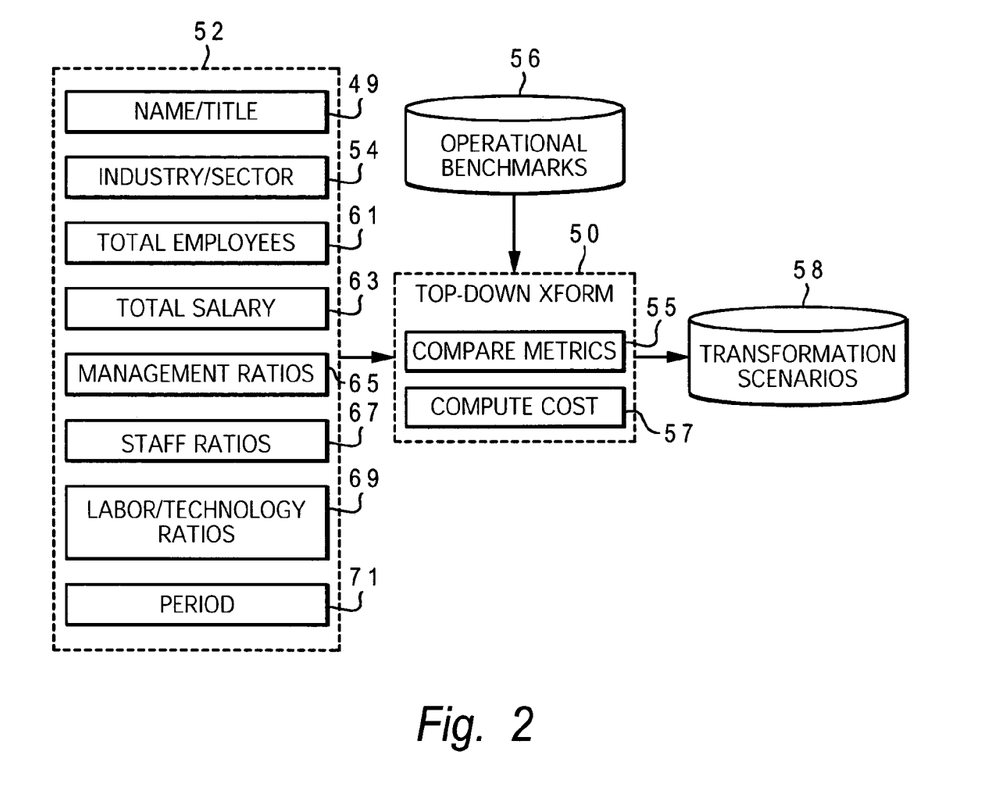
FIG. 2 is a high-level block diagram illustrating a top-down call center transformation modeling tool in accordance with one embodiment of the present invention.

In a preferred embodiment, the present invention provides a solution in the form of a tool comprising an articulated set of processes, systems, and/or computer program means for logically assessing call center transformation solutions based on specified operational and cost-driver metrics. With reference to FIG. 2, there is depicted a high-level block diagram illustrating a computer-implemented top-down business transformation modeling tool 50 in accordance with one embodiment of the present invention. Inputs to modeling tool 50 include call center operational values 52. Modeling tool 50 preferably receives operational values 52 collectively in an input file. Operational values 52 comprise alphanumeric designators that quantify specified call center operational metrics. Call center operational metrics utilized in the depicted embodiment include industry/sector type 54, total number of call center agents 61, agent salary 63, management ratio 65, staff ratio 67, labor/technology cost ratio 69, and transformation period 71 values.

Operational values 52 collectively represent an actual or proposed call center operating scenario. For transformation evaluation purposes, the agents value 61 represents the actual, estimated or projected number of call center agents employed by/assigned to the call center. Salary value 63 is a representative average salary amount for each agent. The management ratio 65 represents the ratio of agents-to-supervisors or vice versa. Staff ratio 67 represents the number of agents per support staff person or vice versa. Labor/technology ratio 69 is the ratio of labor related expenses to technology expenses for the call center. Period value 71 specifies the period over which the call center transformation process is modeled. Operational values 52 further include an industry/sector value 54 specifies the business enterprise (computer sales, mobile phone support, etc.) supported by the call center. Operational values 52 may be obtained from business enterprise records, estimates based on discovery and due diligence activities, or values derived from computer-aided modeling tools.

Modeling tool 50 further receives as input, call center benchmark data stored in a database 56 or other suitable data storage medium. Database 56 stores benchmark or other pre-specified reference values in a file system or equivalent data storage facility that are accessed by tool 50 for retrieving data corresponding to the metrics quantified by operational values 52. Modeling tool 50 may employ database, spreadsheet or other data storage and correlation techniques to access database 56 and retrieve data corresponding to the input operational values 52. Specifically, tool 50 comprises electronic processing and/or program instruction means for retrieving from benchmark database 56 benchmark values corresponding per metric type to one or more of the input operational values 52. In a preferred embodiment, modeling tool 50 utilizes the industry/sector type value 54 as an initial index for pointing to records within database 56 from which data values corresponding to the other operational metric categories may be retrieved for comparative processing by the tool.

Figure 4:
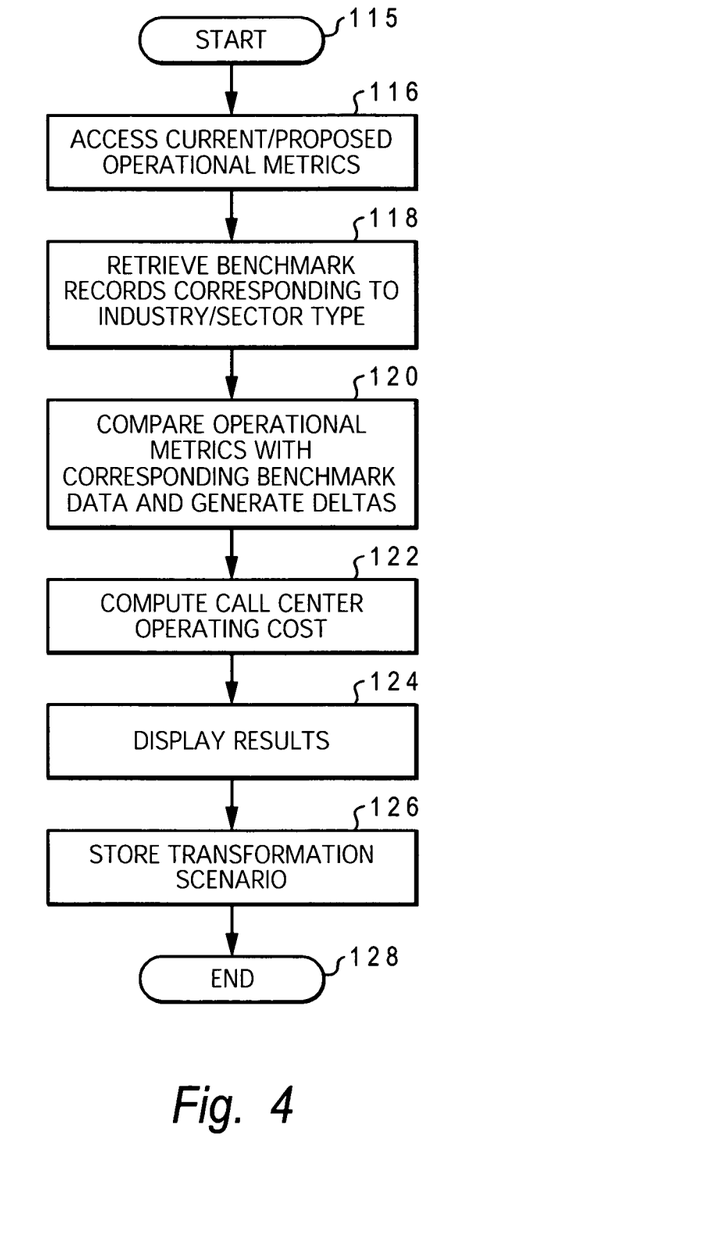
FIG. 4 is a high-level flow diagram illustrating process steps performed during top-down call center transformation modeling in accordance with one embodiment of the present invention.

Modeling tool 50 further includes a compare module 55 having electronic processing and/or instruction means for comparing one or more of operational values 52 with the corresponding (per metric type) benchmark values retrieved from database 56 in accordance with the process shown in FIG. 4. Referring to FIG. 4 in conjunction with FIG. 2, the process begins as illustrated at steps 115 and 116 with the modeling tool 50 accessing operational values 52, which comprise alphanumeric quantifiers of specified call center operational metrics. One such retrieved operational value is the industry/sector value 54 which specifies a categorical identifier of the underlying business enterprise supported by the call center. Different industries or sectors often have differing benchmark values for their respective call center operational metrics. For example, "front office" salaries, including call center agent salaries, may be partially correlated to the skill set and knowledge level required in support of commercial or technical transactions relating to a particular underlying business or product. Based on the specified industry/sector type specified by identifier 54, modeling tool 50 retrieves corresponding benchmark values available for the metrics (e.g., salaries, ratios) as illustrated at step 118. As an example, and assuming the accessed industry/sector identifier 54 specifies "operating system support," modeling tool 50 retrieves from database 56 benchmark values categorized under a file, directory or other naming convention as corresponding to "operating system support." For each of the accessed operational values 52, a corresponding benchmark value is retrieved by the tool 50.

Next, as depicted at step 120, modeling tool 50 employs compare module 55 to comparatively process each of the operational values accessed at step 116 with its corresponding benchmark value retrieved as per step 118. In a preferred embodiment, compare module 55 generates difference values (i.e. positive or negative delta values) specifying the positive or negative difference between the operational values and the corresponding benchmarks. The difference values are computed and displayed as numeric values that may be color-coded to distinguish between positive and negative deltas. This initial comparison provides an initial diagnostic of the cost effectiveness of the current operation. The difference between the input and benchmark metrics provides useful insight into the conformity with industry convention that is useful in formulating a transformation initiative for the call center in question.

As depicted at step 122, modeling tool 50 further includes a module 57 that computes one or more cost values associated with the operational values 52 accessed at step 116. To improve the flexibility of the cost computation(s), the depicted operational values 52 include ratio values 65, 67, and 69 that may be processed in any of multiple combinations with one or more of quantitative values 61, 63, 71 to compute call center cost figures. Call center costs are generally categorized as either labor or technology related. In the depicted embodiment, the labor cost may be computed by multiplying the number of agents value 61 by the salary value 63. The labor/technology ratio 69 may then be processed with the labor cost to derive the total cost of operation without the need for specific technology-related cost metrics. Management ratio and staff ratio values 65 and 67 can be similarly processed by module 57 to compensate for the absence of specific workforce input data.

Modeling tool 50 may further utilize the industry/sector identifier 54 to address gaps in the input data required for the operational cost computation(s) depicted at step 122. Specifically, in the absence of one or more of operational values 52 required for computing one or more operating costs, modeling tool 50 retrieves corresponding records or values from database 56 using industry/sector value 54 similar to the manner specified with reference to step 118.

Labor/technology ratio 69 is often industry-specific as being dependent on the extent of call center automation that the underlying business enterprise permits. For example, call center services provided by a highly automated information- or service-oriented enterprise may be more extensively automated than those permitted by a product-oriented business in which greater human agent interaction is required on average. Therefore, while the depicted embodiment illustrates labor/technology ratio 69 as among the input operational values 52, in an alternate embodiment, ratio 69 may be included in database 56 as an industry-specific benchmark value that is retrieved by modeling tool 50 in accordance with the industry/sector identifier 54. In this manner, the labor/technology ratio value 69 can be accessed and processed in different ways to generate the cost figures. In one embodiment, the ratio 69 is utilized by modeling tool 50 to compute the total cost of call center operations (over the period specified by period value 71) by adding the labor cost (determined by the number of agents 61 and agent salary 63) to the cost of technology as computed from the industry/sector-specific labor/technology ratio 69.

Proceeding with step 124, the difference and operational cost results computed as shown at steps 120 and 122 are displayed on a computer display device or printer. In further response to computation steps 120 and 122, or alternatively in response to manual user selection, the computed results are stored in association with the input operational inputs 52 in a database 58. The data is preferably stored in a file or other discretely identifiable and retrievable data storage unit under a file name such as the file name 49. The process ends as shown at step 128.

Modeling tool 50 further includes electronic and/or program modules and instructions for processing operational values 52 that change over time. For example, a user may enter salary and agent headcount values as operational inputs 52 that change between for consecutive periods (months, quarters, years, etc.). In such a case, the period value 71 preferably specifies a type and number of periodic increments over which the benchmark (or other end state) are to be modeled. Furthermore, the operation cost computation(s) may be advantageously modeled over the course of the transformation program in a manner reflecting the scheduled changes in operational metric values. Assuming a period increment has been specified in period value 71, modeling tool 50 computes, stores, and displays the metric differentials and operational costs on a per period basis. This enables a user to predictively determine likely operational scenarios in the aggregate and at various levels of temporal granularity.

As further illustrated in FIG. 2, modeling tool 50 is communicatively coupled to a transformation scenario database 58 in which the tool 50 stores transformation scenario result files (not depicted). The transformation scenario results are stored as files or other identifiable data storage units in which the user-specified operational metrics 52 and benchmark comparison data and cost data generated by tool 50 are collectively associated under a scenario filename 49 that is preferably a user-specified input included operational parameters 52.

Two major cost drivers for call center operations are labor and technology. Labor costs typically represent up to 80% of the total call center operation cost. While many detailed metrics impact the total labor costs, reliable labor cost estimates can be obtained by processing the number of employees and corresponding salaries. Technology costs included among operational metrics 52 are obtained from a number of sources including telecommunication costs, IT infrastructure and service costs.

The ratios of management personnel to call center agents and support staff to contact center agents, represented in FIG. 2 as management ratios 65 and staff ratios 67, enable modeling tool 50 to flexibly determine employee counts by leveraging the relative distribution of those employees. Different processes and initiatives can be implemented in a proposed transformation plan to alter these ratios as necessary to improve efficiency as measured by the total operating cost. The combination of these labor cost factors is critical to estimating the total cost of call center operation particularly since, in the initial stages of a transformation project, the total cost of technology or labor may not be known to the practitioner. Modeling tool 50 generates transformation scenario result files stored in database 58 reflecting specified changes across different transformation metrics. The scenario result files within database 58 provide a mutually comparable repository of scenarios reflecting different metric combinations and permutations of the implementation of operational metrics and the individual and aggregate operational and cost benefits of such scenarios. For example, a significant reduction in salaries (e.g., based on movement of labor to a lower cost country) can lose its overall weight if the actual number of agents is also declining. A program that focuses on automation to reduce agent count, without lower salaries, may result in similar savings to the ones obtained by a program that achieves lower salaries but does not reduce headcount.

Figure 3:
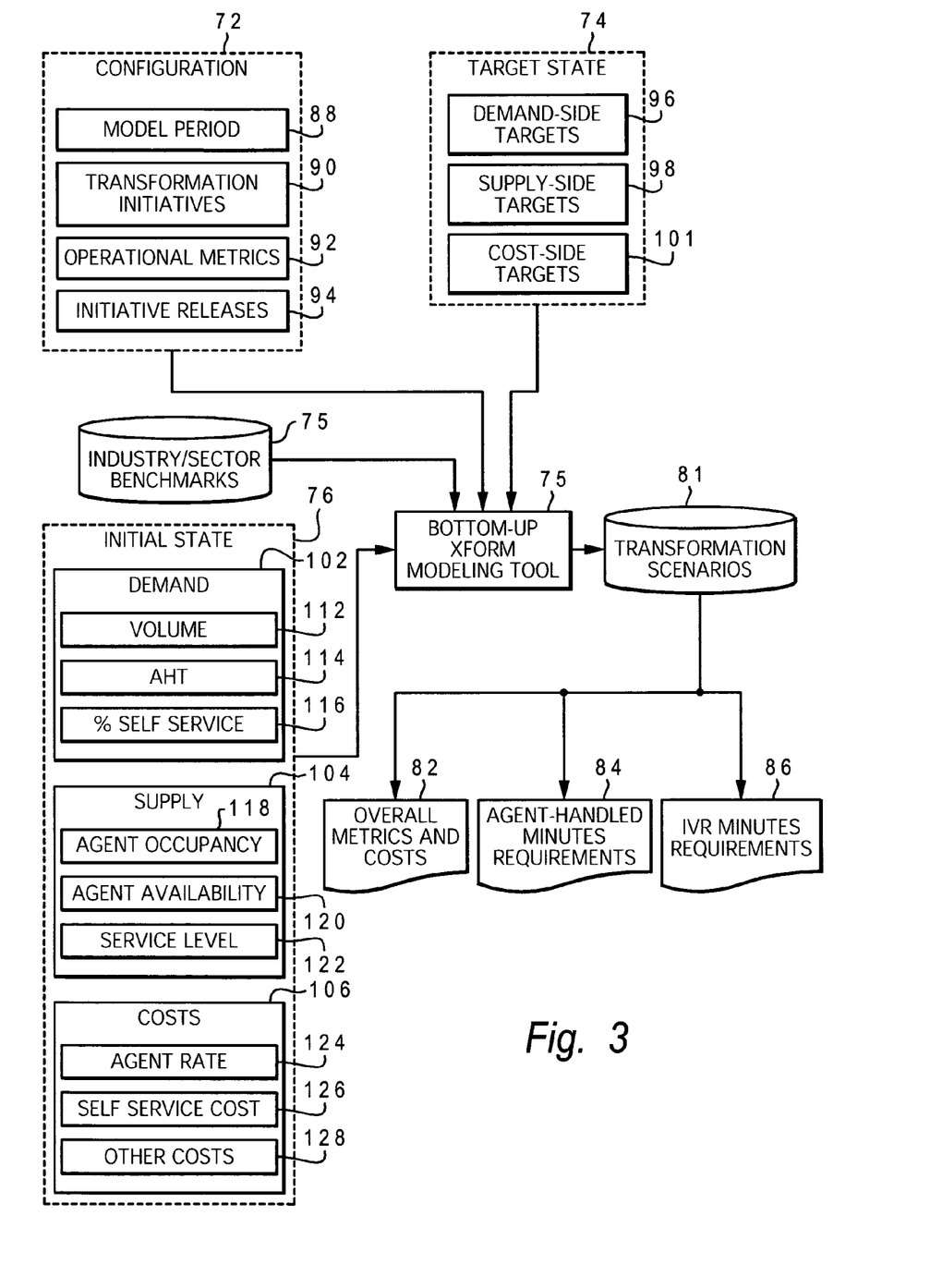
FIG. 3 is a high-level block diagram depicting a bottom-up call center transformation modeling tool in accordance with an alternate embodiment of the present invention.

With reference to FIG. 3, there is illustrated a high-level block diagram depicting a bottom-up call center modeling tool in accordance with an alternate embodiment of the present invention. Specifically, FIG. 3 depicts a modeling tool 75 adapted for modeling a call center transformation process. Modeling tool 75 receives as inputs configuration data 72, initial state data 76, and target state data 74. Configuration data 72 generally comprises input data specifying process-specific parameters and data types processed by modeling tool 75 during call center transformation modeling. Specifically, configuration data 72 includes one or more operational metric specifiers 92 (e.g. number of agents, agent salary, labor/technology ratio, etc.) that specify the metric types such as those quantified by operational values 52 processed by modeling tool 75. Metric specifiers 92 are non-quantitative, process-specific metric categories that collectively form the performance and cost metric criteria for a given transformation proposal or initiative.

Configuration data 72 further includes a period value 88, one or more transformation initiatives 90, and a value 94 specifying the scheduling of releases of initiatives 90. Period value 88 specifies the period(s) over which a given transformation process is modeled. Model period value 88 may be specified in one of many possible periodic increments (e.g. weeks, months, quarters). For example, period 88 may be specified as a number of periods that determine the frequency at which values for specified operational metrics 92 will be computed and displayed. In an alternate embodiment, period 88 may be specified as a range having an start date, an end date, and a number of sub-interval periods (e.g. Jan. 1, 2005; Dec. 31, 2009;60; would result in 60 monthly periods over a four-year range). In either case, the frequency of the sub-interval periods specified by period value 88 preferably corresponds to the maximum frequency at which transformation sub-processes 90 are initiated in the overall transformation process.

Transformation initiatives 90 generally comprise data describing one or more labor and/or technology related programs or performance metrics that effectuate or reflect an improvement in one or more call center performance metrics. Examples of technology related transformation initiatives 90 include: equipment upgrades that result in reduced time to answer a call, specified system performance levels, etc. Labor related initiatives may include specified training and education programs, altering the agent-to-manager ratio, etc. The relative scheduling of transformation initiatives 90 is specified by the initiative releases value(s) 94, and the absolute scheduling determined by modeling tool 75 from the model period 88 in conjunction with initiative release(s) 94.

Releases 94 specify the relative or absolute points in time during modeling period 88 that transformation initiatives 90 are implemented. Each of initiatives 90 may comprise a number of component projects or activities that are grouped under a common initiative name or title. The data contained within a given one of initiatives 90 may specify multiple process effects (typically process efficiency or cost benefits) that are implemented as specified by releases 94 at various points during the modeling period 88. A release 94 may also represent implementation of a specified set of projects in a limited number of locations or systems (e.g., a particular automated system may be implemented across different contact centers in a phased approach).

While configuration data 72 specifies the process-specific scheduling and metrics used for modeling the transformation, initial state data 76 generally includes quantified operational values representing a proposed or actual initial operational state of one or more call centers. In the depicted embodiment, initial state data 76 includes demand data 102, supply data 104, and cost data 106. Demand data 102 comprises data values characterizing client or customer demand for handled call time (i.e., call time requiring in-person call handlers). In accordance with the depicted embodiment, the demand input values include a traffic volume 112, an average handle time (AHT) 114, and a percentage of self-serviced calls value 116.

Traffic volume 112 represents the total time consumed by customer or contact center initiated calls over a specified period. Traffic volume 112 is determined by the number of calls and the time spent by agents handling the calls, resulting in the amount of time spent by call center agents handling incoming or outgoing calls over a specified time increment (e.g. 10,000 call hours per day). Traffic volume 112 can be entered and processed as an aggregate metric (over a day, week, or month), or can be more specifically characterized to account for differences in volume over a specified time increment. Furthermore, traffic volume 112 may quantify an aggregate metric distributed across one or more call types (total number of calls, percentage of support calls versus sales calls, etc.). When different demand or performance metrics are applicable to different types of calls, the traffic volume value 112 is preferably individually specified for each different call type. Multiple values for traffic volume 112 may also be utilized to account for projected changes in business volume or process development. The values may be entered either as user-specified call volumes for each period, or by specifying a period-to-period growth rate (e.g. 10% quarter to quarter).

Other demand inputs 102 include AHT 114 and percentage of self-service or automated calls 116. AHT 114 specifies the average amount of time spent by an agent providing service to a customer call (incoming or outgoing). AHT 114 preferably includes the time the agent provides on-line service (talk time) in addition to wrap-up time—time for completing additional activities pursuant to completing the call service and preparing for the next call. AHT 114 may be an aggregate average across all calls, or an average for a specified call type depending on and mutually consistent with the traffic volume value(s) 112. The percentage of automated calls 116 is an important parameter impacting both agent staffing and technology requirements. The combined initial state demand data 102 values may be processed by modeling tool 75 to generate aggregate estimates such as "total call minutes" that can be used to estimate the required capacity (agent staffing or technology) required to serve such call center demand.

Supply data 104 generally comprises information characterizing the availability of agent and automated call handling resources over or a specified period or at one or more points in time. In the depicted embodiment, supply data 104 includes agent occupancy 118, agent availability 120, and service level 122. Agent availability 120 specifies the average amount or percentage of time an agent is available for call center related work, and is determined by such factors as work hours per year, training time, vacation time, sick time, etc. Agent occupancy 118 specifies the percentage of the agent availability 120, as an average, that the typical agent is expected to directly handle calls (on-phone time) or perform call wrap-up work. Higher agent occupancy values 118 result in fewer agents required to serve the same call volume but also result in longer wait times (or lost calls), as the agent is more likely to be on the phone, and not available to take a new call at any given time.

Occupancy 118 may be entered as one or multiple values corresponding to the call types specified by traffic volume 112, or may be computed based on other demand metrics, such as speed to answer (percentage of calls to be answered within a particular period, e.g. 90% of calls answered in less than 10 seconds, usually represented as 90/10). Modeling tool 75 may include Erlang distribution modules to estimate maximum allowable occupancy required to achieve a specified speed-to-answer level.

Supply data 104 may also be specified in terms of a service level ratio 122. In a preferred embodiment the service level ratio 122 may be expresses as %/#, where % represents the percent of calls answered within # seconds (e.g. 90/20 represents a rate of 90% of calls answered within 20 seconds).

Initial state costs 106 generally include actual or projected initial state cost figures. Included among the depicted initial state costs 106 are labor costs represented in the depicted embodiment as a labor rate 124. Initial state costs 106 further includes automation and general technology costs represented in the depicted embodiment as a technology support cost 126. Miscellaneous costs 128 cover other expenses not directly related to labor or technology. Labor rate 124 is preferably derived at least in part from agent per hour employment rates or per handled minute rates for on-phone agent time. Technology support costs 126 may include several operational, hardware and licensing costs related to self-service automation such as Interactive Voice Response (UVR) services and the like. Technology support costs 126 are information technology (IT) related costs related to handling a call utilizing an autonomic procedure. Such autonomic procedural costs include web hosting costs, self-service application development and maintenance costs. In addition or in the alternate, the initial operating costs 106 can be provided as an aggregate value over the entire transformation model period 88, or may be specified for each periodic increment specified by period 88.

As further depicted in FIG. 3, another major transformation modeling input to tool 75 is target state data 74, which generally comprises data values corresponding to user-specified target performance levels for the call center transformation process. The depicted target data 74 includes demand-side target values 96, supply-side target values 98, and cost-side target values 101 for selected operational and cost metrics categorically corresponding to demand data 102, supply data 104, initial state costs 106.

Target data 74 quantifies the values the demand, supply and cost metrics are expected to take at the end of the transformation process in accordance with the initial state data 76 and configuration data 72. Although not explicitly depicted in FIG. 3, the demand-side, supply-side and cost-side target data 96, 98, and 101 includes target values corresponding to each of the values within the initial state demand, supply and cost data 102, 104 and 106. For example, the target supply-side data 98 preferably includes an AHT value (not depicted) reflecting a delta from the initial state demand AHT value 114.

Figure 5:
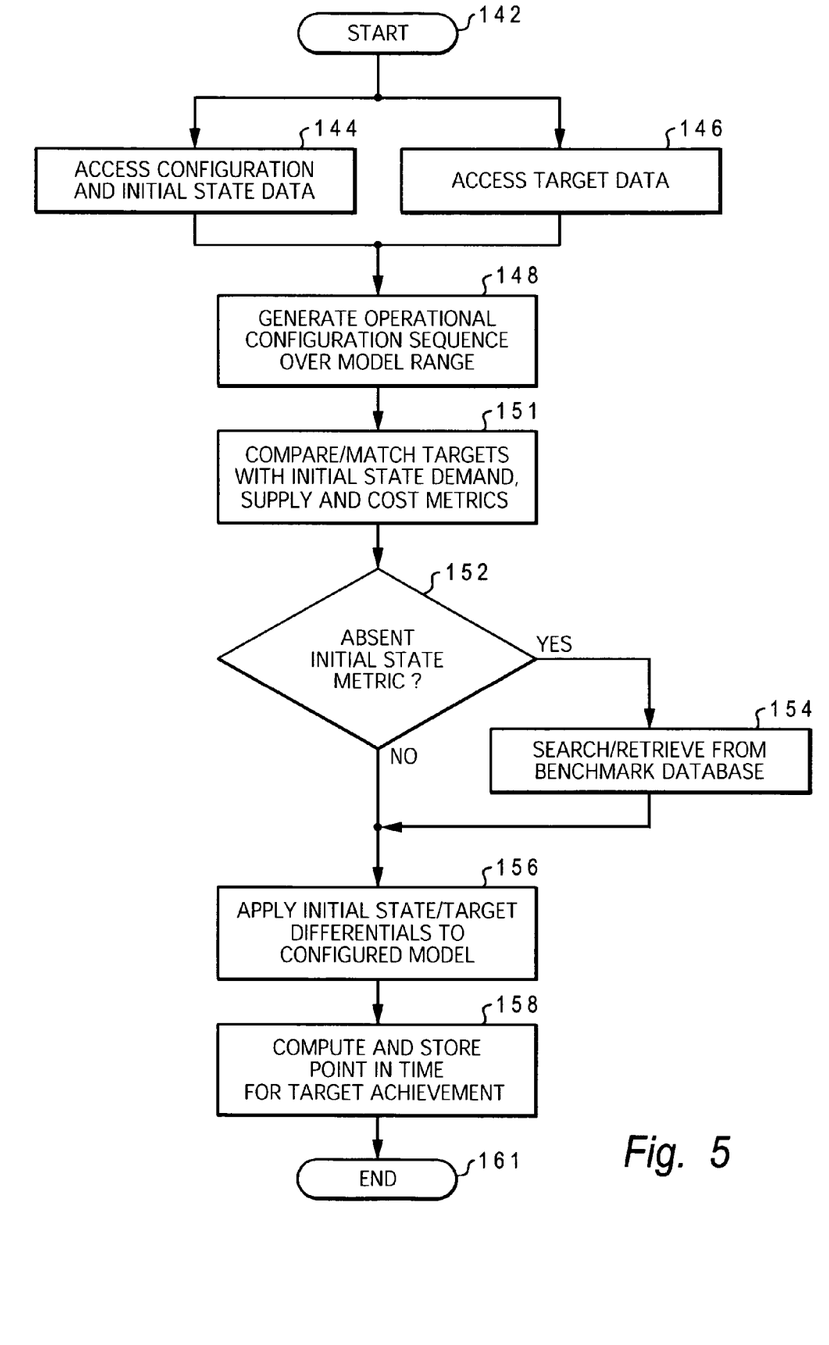
FIG. 5 is a high-level flow diagram depicting process steps performed during bottom-up call center transformation modeling in accordance with an alternate embodiment of the present invention.

Referring now to FIG. 5 in conjunction with FIG. 3, there is depicted a high-level flow diagram illustrating process steps performed during bottom-up call center transformation modeling in accordance with an alternate embodiment of the present invention. The transformation modeling process begins as illustrated at step 142 and proceeds to steps 144 and 146 depicting modeling tool 75 receiving or otherwise accessing input data that generally describes and quantifies various operational and cost metrics that are utilized in characterizing a call center transformation process. Specifically, step 144 depicts modeling tool 75 accessing the configuration data 72 and initial state data 76, and step 146 depicts the tool accessing target data 74 such as described in FIG. 3.

Having accessed configuration data 72, modeling tool 75 processes model period 88 to generate an electronically stored chronological schedule comprising a start data, a finish date, and preferably further includes one or more intermediate period points. Operational configuration data such as that contained in transformation initiative data 90 and operational metrics 92 are processed in conjunction with the values for initiative release(s) 94 to generate an electronically storable resultant transformation configuration data set (step 148). The data set may be stored and displayed on a computer display device in a manner depicting scheduled implementation of the initiatives as per the point in time data contained in release data 94.

Proceeding as illustrated at step 151, modeling tool 75 processes the target values provided in target state data 74 to the values provided in initial state data 76 to determine whether one or more demand, supply or cost target values have corresponding values provided in initial state data 76. Responsive to finding a non-matched target value, and as illustrated at steps 152 and 154, modeling tool 75 searches or otherwise accesses a benchmark database 73 to retrieve benchmark values to be used as substitutes for the absent initial state values. In a preferred embodiment, modeling tool 75 uses an industry/sector identifier, such as that described with reference to FIG. 2, included among operational metrics 92 as a pointer to retrieve benchmark values most closely correlated to the enterprise supported by the object call center.

Call center transformation modeling continues as depicted at step 156 with modeling tool 75 applying the individual differences or deltas between each the initial state data 76 and corresponding values in target state data 74 to the configured data model. Continuing as illustrated at step 158, modeling tool 75 processes the difference values in conjunction with the transformation initiative and timing data provided by configuration data 72 to compute the relative point in time values that one or more of the target values specified by target state data 74 are achieved during the specified transformation period 88. The difference values are stored in association with the initial state values 76, the target values 74 and the configuration model derived from configuration data 72 as a discretely accessible transformation scenario data structure in a database 81 or other suitable file system utility. As depicted in FIG. 3, the resultant transformation scenario file stored in database 81 also includes data values specifying the overall operational metric figures and costs 82, agent handled call time requirements 84, and technology supported call handling requirements 86.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. In a data processing system, a method for modeling a business transformation process, said method comprising:
  receiving as input, in a memory of said data processing system, multiple operational resource values associated with a specified transformation process to be applied to a business enterprise, wherein said multiple operational resource values include at least a first operational resource value expressed as a management ratio between human agents and human supervisors and at least a second operational resource value expressed as a cost ratio between labor costs and technology costs;
  determining an estimated cost of application of the specified transformation process to the business enterprise by comparatively processing, utilizing a transformation modeling module executing on a processor of said data processing system, said multiple operational resource values with respect to one or more target operational resource values, wherein said comparatively processing includes comparatively processing the first and second operational resource values with respect to an industry-specific, management ratio benchmark value and an industry-specific, cost ratio benchmark value, respectively, and wherein:
    said one or more target operational resource values include an enterprise type identifier;
    said comparatively processing step comprises selecting said one or more target operational resource values in accordance with said enterprise type identifier; and
  outputting said estimated cost.

2. A computer program product, comprising:
  a computer-readable storage device; and
  program code for modeling a business transformation process stored within the computer-readable storage device, wherein said program code, when executed by a processor of a data processing system, causes the data processing system to perform:
  receiving as input, in a memory of said data processing system, multiple operational resource values associated with a specified transformation process to be applied to a business enterprise, wherein said multiple operational resource values include at least a first operational resource value expressed as a management ratio between human agents and human supervisors and at least a second operational resource value expressed as a cost ratio between labor costs and technology costs;
  determining an estimated cost of application of the specified transformation process to the business enterprise by comparatively processing, utilizing a transformation modeling module of said data processing system, said multiple operational resource values with respect to one or more target operational resource values, wherein said comparatively processing includes comparatively processing the first and second operational resource values with respect to an industry-specific, management ratio benchmark value and an industry-specific, cost ratio benchmark value, respectively, and wherein:
    said one or more target operational resource values include an enterprise type identifier;
    said comparatively processing step comprises selecting said one or more target operational resource values in accordance with said enterprise type identifier; and
  outputting the estimated cost.

3. A data processing system comprising:
  a memory configured to receive multiple operational resource values associated with a specified transformation process to be applied to a business enterprise, wherein said multiple operational resource values include at least a first operational resource value expressed as a management ratio between human agents and human supervisors and at least a second operational resource value expressed as a cost ratio between labor costs and technology costs;
  a processor in communication with said memory;
  a transformation modeling module, executable by said processor, the transformation modeling module configured to perform:
  determining an estimated cost of application of the specified transformation process to the business enterprise by comparatively processing said multiple operational resource values with respect to one or more target operational resource values, wherein said comparatively processing includes comparatively processing the first and second operational resource values with respect to an industry-specific, management ratio benchmark value and an industry-specific, cost ratio benchmark value, respectively, and wherein:

said one or more target operational resource values include an enterprise type identifier;

said comparatively processing step comprises selecting said one or more target operational resource values in accordance with said enterprise type identifier; and responsive to said comparatively processing, outputting the estimated cost.

4. The method of claim 1, wherein the specified transformation process comprises a call center transformation process.

5. The computer program product of claim 2, wherein the specified transformation process comprises a call center transformation process.

6. The data processing system of claim 3, wherein the specified transformation process comprises a call center transformation process.

\* \* \* \* \*